US007359836B2

United States Patent
Wren et al.

(10) Patent No.: US 7,359,836 B2
(45) Date of Patent: Apr. 15, 2008

(54) HIERARCHICAL PROCESSING IN SCALABLE AND PORTABLE SENSOR NETWORKS FOR ACTIVITY RECOGNITION

(75) Inventors: Christopher R. Wren, Arlington, MA (US); Emmanuel Munguia Tapia, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 251 days.

(21) Appl. No.: 11/341,649

(22) Filed: Jan. 27, 2006

(65) Prior Publication Data

US 2007/0179761 A1     Aug. 2, 2007

(51) Int. Cl.
*G06F 15/00* (2006.01)
(52) U.S. Cl. ..................................... 702/189
(58) Field of Classification Search .................. 702/189
See application file for complete search history.

(56) References Cited

U.S. PATENT DOCUMENTS

2004/0210344 A1* 10/2004 Hara et al. .................. 700/245

FOREIGN PATENT DOCUMENTS

WO      2007/086486    *  8/2007

OTHER PUBLICATIONS

Tseng et al. "An Energy-Efficient Approach for Real-Time Tracking of Moving Objects in Multi-Level Sensor Networks", Aug. 2005, IEEE, pp. 305-310.*

Wren et al. "Toward Scalable Activity Recognition for Sensor Networks", Mar. 2006.*
Aaron F. Bobick. Movement, activity and action: the role of knowledge in the perception of motion. Philosophical Transactions: Biological Sciences, 352(1358):1257-1265, 1997.
Ross Cutler and Larry Davis. Real-time periodic motion detection, analysis and applications. In Conference on Computer and Pattern Recognition, pp. 326-331, Fort Collins, USA, 1999. IEEE.
Yuri Ivanov, Bruce Blumberg, and Alex Pentland. Em for perceptual coding and reinforcement learning tasks. In 8th International Symposium on Intelligent Robotic Systems, Reading, UK, 2000.
N. Johnson and D. Hogg. Learning the distribution of object trajectories for event recognition. Image and Vision Computing, 14(8), 1996.
David Minnen, Irfan Essa, and Thad Starner. Expectation grammars: Leveraging high-level expectations for activity recognition. In Workshop on Event Mining, Event Detection, and Recognition in Video, held in Conjunction with Computer Vision and Pattern Recognition, vol. 2, p. 626. IEEE, 2003.

(Continued)

*Primary Examiner*—Michael P. Nghiem
*Assistant Examiner*—Cindy D. Khuu
(74) *Attorney, Agent, or Firm*—Dirk Brinkman; Clifton D. Mueller; Gene V. Vinokur

(57) ABSTRACT

Binary motion events are detected by individual motion sensors placed in a physical environment. The motions events are transmitted to a cluster leader, each motion detector being a cluster leader of immediately spatially adjacent motion sensors. Movements of objects are detected by the cluster leaders according to the motion events. The movements are transmitted to supercluster leaders, each motion detector being a supercluster leader of immediately spatially adjacent motion clusters of sensors. Activities of the objects are detected by the supercluster leaders, and actions of the objects are detected according to the activities.

19 Claims, 6 Drawing Sheets

OTHER PUBLICATIONS

Thomas B. Moeslund and Erik Granum. A survey of computer visionbased human motion capture. Computer Vision and Image Understanding, 81:231-268, 2001.

Lawrence R. Rabiner. A tutorial on hidden markov models and selected applications in speech recognition. Proceedings of IEEE, 77(2):257-285, 1989.

Chris Stauffer and Eric Grimson. Learning patterns of activity using realtime tracking. IEEE Transactions on Pattern Recognition and Machine Intelligence, 22(8):747-757, 2000.

Andrew Wilson and Aaron Bobick. Realtime online adaptive gesture recognition.In Proceedings of the International Conference on Pattern Recognition, Barcelona, Spain, Sep. 2000.

Daniel H. Wilson and Chris Atkeson. Simultaneous tracking & activity recognition (star) using many anonymous, binary sensors. In The Third International Conference on Pervasive Computing, 2005.

Christopher R. Wren and Srinivasa G. Rao. Self-configuring, lightweight sensor networks for ubiquitous computing. In The Fifth International Conference on Ubiquitous Computing: Adjunct Proceedings, Oct. 2003.

* cited by examiner

HIERARCHICAL PROCESSING IN SCALABLE AND PORTABLE SENSOR NETWORKS FOR ACTIVITY RECOGNITION

FIELD OF THE INVENTION

The invention relates generally to sensor networks, and in particular to modeling the movement of people in an environment with sensor networks to recognize activities in the environment.

BACKGROUND OF THE INVENTION

If sensor networks could interpret the movement and activities of people within buildings, then the buildings could be safer and more efficient. Safety could be enhanced by a sensor network that is able to provide current census data to enhance adaptive evacuation plans, for example. Security would be enhanced by systems that can interpret daily activity patterns in buildings and flag unusual activities. Predicting the activities of inhabitants enables greater energy efficiency in heating, lighting, and elevator scheduling.

One network of sensors is described by Wilson et al., "Simultaneous tracking & activity recognition (star) using many anonymous, binary sensors," The Third International Conference on Pervasive Computing, 2005. That network is targeted for a home where only a small number of people are present at any one time. Wilson applied a classic 'track-then-interpret' methodology.

However, an environment with more people, such as an office building, school or factory, requires exponentially more hypotheses that must be determined for tracking people and interpreting higher levels of activities. Therefore, that method was only applicable to low-census buildings, such as residential homes. Further, the exact placement of sensors in the home environment was essential. That level of specialization is not economical in large buildings, or where usage patterns change dynamically.

The prior art also describes methods for interpreting human activities from images in a video, Bobick, "Movement, activity and action: the role of knowledge in the perception of motion," Philosophical Transactions: Biological Sciences, 352(1358): 1257-1265, 1997. Bobick described a framework for using time and context in video to interpret human behavior. He broke down behavior into a tripartite hierarchy consisting of movements, activities, and actions. The most basic activities were called movements. Movements have relation to the spatial context and no temporal structure. Short sequences of movements were combined with some temporal structure to form activities. The activities were interpreted within the larger context of the participants and the environment to recognize actions. However, Bobick's method requires cumbersome image analysis of video frames acquired by costly video cameras.

Other prior art describing the interpretation of human behavior in video includes Stauffer et al., "Learning patterns of activity using realtime tracking," IEEE Transactions on Pattern Recognition and Machine Intelligence, 22(8):747-757, 2000; Johnson et al., "Learning the distribution of object trajectories for event recognition," Image and Vision Computing, 14(8), 1996; Minnen et al., "Expectation grammars: Leveraging high-level expectations for activity recognition," Workshop on Event Mining, Event Detection, and Recognition in Video, Computer Vision and Pattern Recognition, volume 2, page 626, IEEE, 2003; Cutler et al., "Real-time periodic motion detection, analysis and applications," Conference on Computer and Pattern Recognition, pages 326-331, Fort Collins, USA, 1999; and Moeslund et al., "A survey of computer vision based human motion capture," Computer Vision and Image Understanding, 81:231-268, 2001.

A common thread in most prior art work is that tracking objects is the first stage of processing. That limits the work to sensor modalities that can provide highly accurate tracking information in the absence of any high-level inference, i.e., video cameras.

The ambiguities inherent in using a motion detector network can introduce enough noise in the tracking results to render most of those approaches unusable. Therefore, there is a need for a method for recognizing activities using a sensor network that overcomes the problems of the prior art.

SUMMARY OF THE INVENTION

The embodiments of the invention provide a sensor network and activity recognition method that enables the sensor network to sense and recognize the context of building occupants in an economical, scalable, efficient, and privacy-sensitive manner. The sensor network includes nodes that are binary sensors. In one embodiment, the nodes are passive infrared motion detectors. These nodes only detect presence and movement of heat sources, e.g., people, so the sensors preserve much of the privacy of the occupants.

The system can estimate a topology of the network and use that information to form local context neighborhoods around each node. These neighborhoods are the basis for portable activity recognition as well as system scalability. Being portable, sensors can easily be moved to other environments and put into operation without further retraining. The neighborhoods are large enough to accurately detect components of human activities in a building.

There is no necessity to track specific individuals before an activity is recognized, which allows the sensor network to be constructed with inexpensive sensors, and eliminates much of the computational overhead associated with high-fidelity, e.g., video, tracking of the prior art.

By accurately detecting low-level movement behaviors locally, the amount of data that must be communicated outside the neighborhoods is greatly reduced. These features support scalability.

The neighborhoods are also small enough to be invariant to the larger context of a building. This means that the detectors can be moved from location to location as environments are physically reconfigured. This fact reduces the overall cost by eliminating much of the on-site calibration, training and engineering cost. Similar scalability and re-usability benefits can be found by combining these neighborhoods into super-neighborhoods.

The invention uses hierarchical neighborhood architecture. The architecture makes sense both from a communication efficiency point of view and from a behavioral context point of view.

DETAILED DESCRIPTION OF THE PREFERRED EMBODIMENT

System Structure

Figure 1:
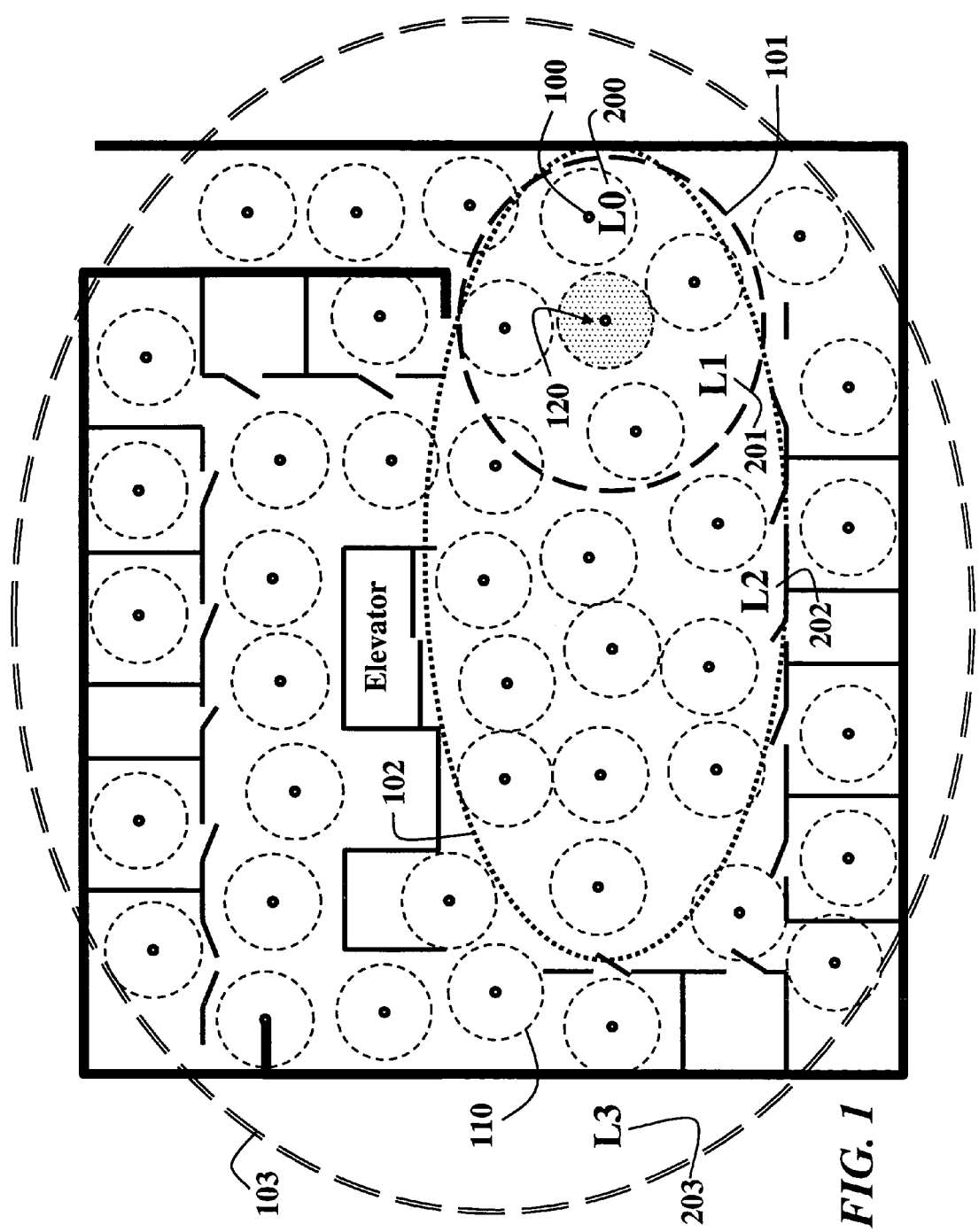
FIG. 1 is a schematic of a hierarchical network of sensors according to an embodiment of the invention.
Figure 2:
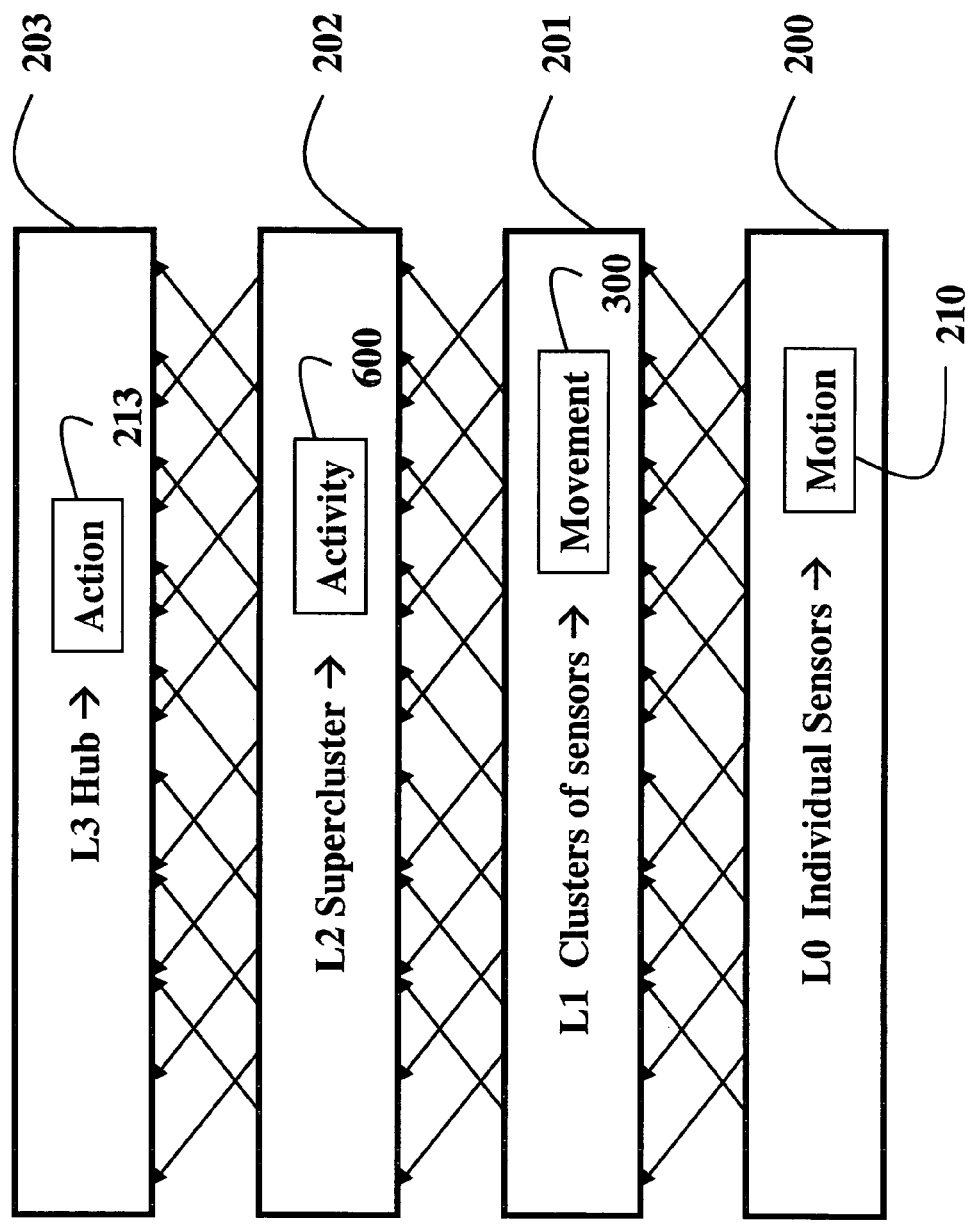
FIG. 2 is a block diagram of the network of FIG. 1.

FIG. 1 shows a hierarchical sensor network according to the invention in a building environment. FIG. 2 shows the hierarchy of the network diagrammatically. The hierarchy levels include L0 200 (individual sensors 100), L1 201 (clusters of sensors 101), L2 202 (superclusters 102), and L3 203 (hubs 103).

The hierarchical levels respectively detect motions, movements, activities, and actions of objects, e.g., people in the environment.

Motion is simply a raw binary event signaled by the motion sensors. Movements do not have significant temporal structure so they can be recognized with simple models that do not rely on a larger context. That is, movements can be detected locally. Activities are groups of movements, so activities can cover a larger area, but can still be detected locally without the benefit of a global context. Activities may incorporate some significant temporal structure. Actions require a global context to be detected, and may have a complex grammar to their structure. Therefore actions are best recognized centrally. That is, actions are best recognized at the floor or building level, hereinafter a 'hub' level.

Sensors

At a lowest level L0 of our hierarchy are individual motion sensors. A single sensor detects motion in a level L0 neighborhood, i.e., a degenerate neighborhood with only a single member. In one embodiment of the invention, the sensors 100 are wireless motion detectors. The sensors reliably detect motion in a small area. In our case, the coverage area 110 of each sensor covers a circular neighborhood with a radius of about two meters. The sensors can be operated by any conventional power source.

Specifically, the sensors can be passive infrared (PIR) motion detectors. This is the same sensing technology used in most motion-activated lights and appliances. The sensors are reliable, very cheap and require little power. We use the KC7783R sensor package from Comedia Ltd., Hong Kong. The sensors, as adapted by us, can generate several events per second.

Effectively, the sensor is a two-pixel thermal 'camera' with a spatial multiplexing lens rendered in plastic. The lens is multi-faceted, mapping disparate small regions of the thermal scene onto the two pixels. When an individual is within view of the sensor, the moving heat source changes the thermal signature measured by the device, and a rising voltage edge is generated.

Figure 5:
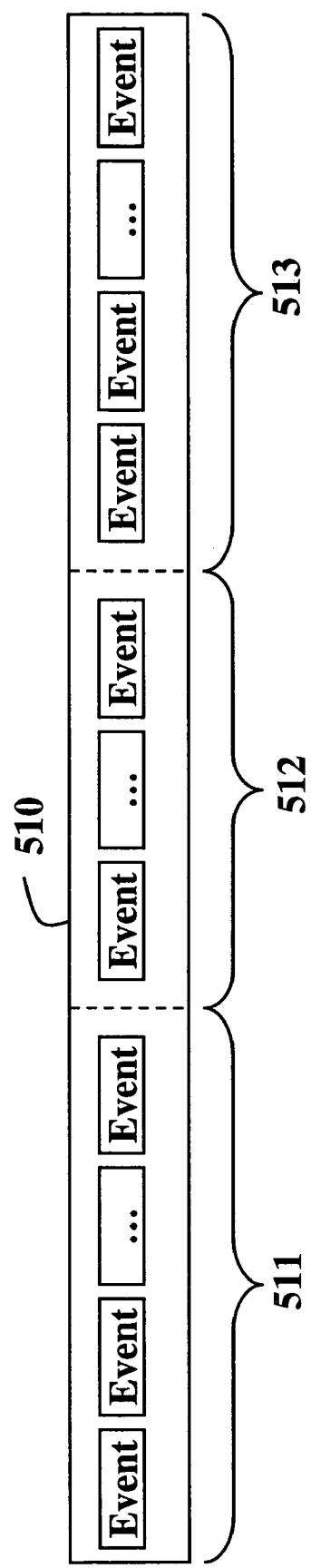
FIG. 5 is a block diagram of an event stream according to an embodiment of the invention.

The output of the sensor at level L0 is the stream 510 of binary events, as shown in FIG. 5. When motion is detected, a sensor-specific ID is broadcast wirelessly. The event is also associated to a timestamp.

The individual sensors have limited capabilities. For example, the sensors cannot differentiate one person from a group of several people, or a person from an animal. However, the sensors are cheap, small, simple, and reliable within a well-understood range of capability.

The sensors generate radio signals that represent binary events in response to changes in the environment. The binary event is the basic unit of observation that we take as input to higher levels of the hierarchical processing.

Any sensing technology that can generate such a stream of binary events, i.e., any binary sensing technology, can be used to implement this level. The events are on a most basic and most local end of a behavior spectrum in the environment.

Hereinafter, we call these detected events simply motions 210 to differentiate these events from more interesting movements 300. By motion, we simply mean that there is an object in motion near the sensor, but its direction of movement is unknown.

Clusters

The level L1 of the hierarchy includes clusters of sensors. One sensor in the cluster is declared a cluster leader 120. Thus, the cluster includes the cluster leader sensor and sensors in an immediate vicinity. The immediate vicinity is defined as the sensors that are only one step away from the leader in any direction in terms of a network topology.

If there are 100 sensors, then there can also be 100 clusters. Each node leads one cluster of its immediate neighbors, even while the cluster leader can participate in many clusters around it. All movements are defined as happening at the lead sensor in a cluster. It is therefore advantageous to have clusters associated with every sensor to detect the movement events in the vicinity of the sensor. However, it may be possible for some environments to relax this one-to-one relationship between clusters and sensors, and the number of clusters may be less than the number of sensors.

We assume that numerous sensors are placed in an environment, with little or no overlap between sensor activation fields 110, but also with little or no gap between activation fields of adjacent sensors. That is, the areas sensed by the sensors are substantially disjoint and spatially adjacent, see FIG. 1. This type of spatial coverage is generally known as 'tiling'. We use the qualifier 'substantially' because a perfect tiling is impossible with circular tiles. If each sensor has a radius of about two meters and the environment is 'tiled' with sensors, then a typical cluster has about ten sensors, with a total radius of about six meters. The clusters of sensors can recognize movements 300 of objects.

Figure 3:
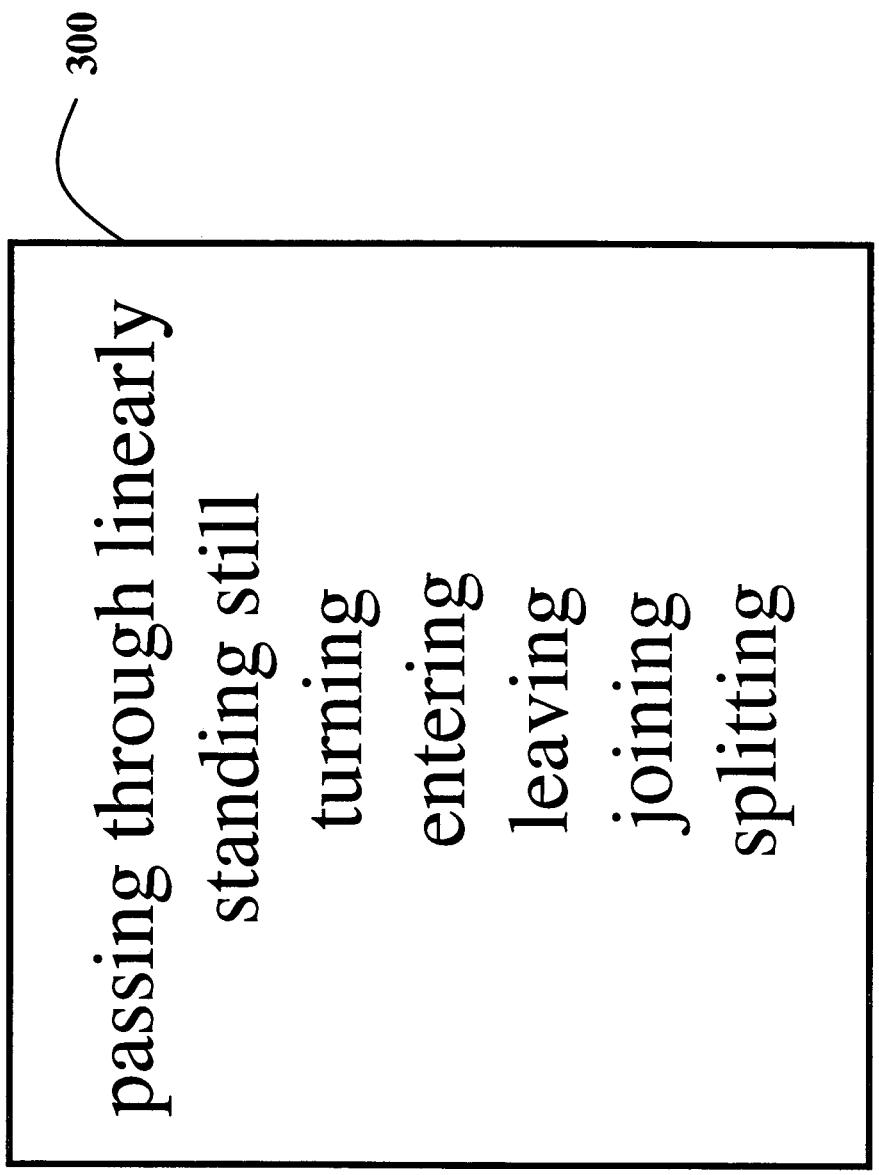
FIG. 3 is a block diagram of motion events according to an embodiment of the invention.

As shown in FIG. 3, we define a set of possible movements that occupants of an environment might exhibit in a small area: passing through linearly, standing still, turning, entering, leaving, joining, and splitting.

Figure 4A:
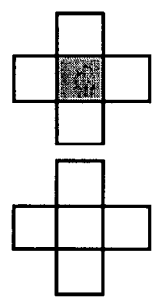
FIGS. 4A-4E are block diagrams of movements according to an embodiment of the invention.
Figure 4B:
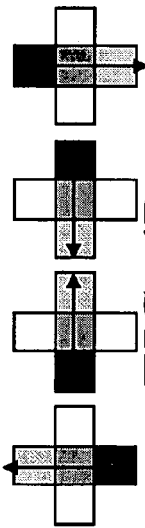
Figure 4C:
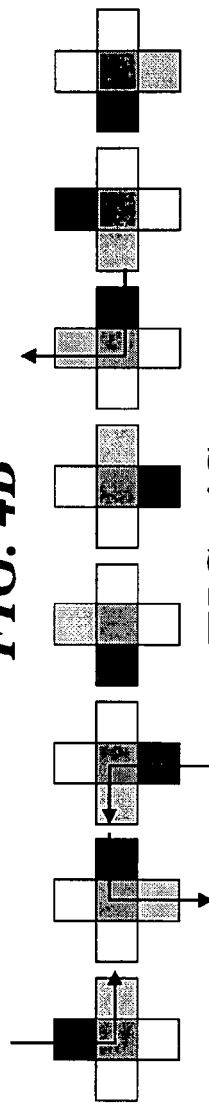
Figure 4D:
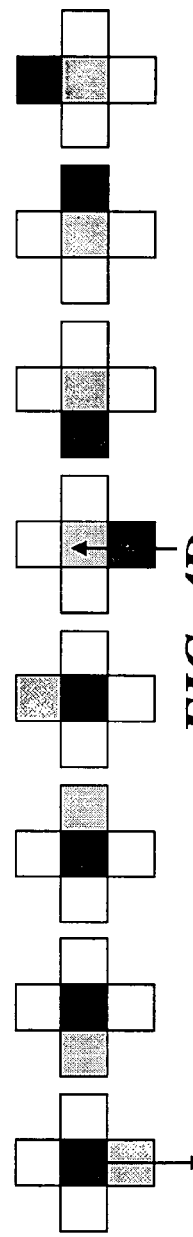
Figure 4E:
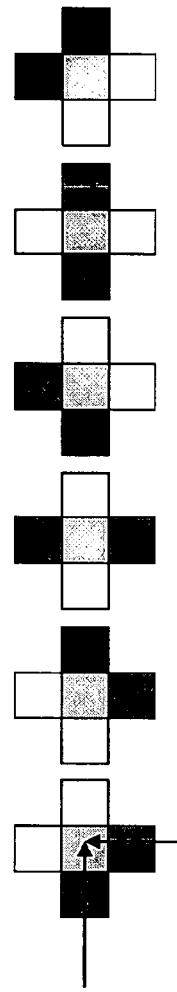

FIGS. 4A-4E show diagrammatically some example movements detected at level L1 clusters of five sensors. In the FIGS. 4A-4E, time moves from dark to light shades, and the arrows indicate the general direction of movement. FIG. 4A shows standing still behavior. FIG. 4B shows linear movement, e.g., bottom to top, left to right, etc. FIG. 4C shows turning, e.g., top to right, right to bottom, etc. FIG. 4D shows exiting and entering. FIG. 4E shows joining.

We believe that these movements are so basic and so local that we can train clusters of sensors for these basic movements.

As shown in FIG. 2, the cluster leader 120, collects the motion events 210 from level L0 sensors, that is, from immediate neighboring sensors.

As shown in FIG. 5, a stream 510 of events is segmented into intervals 511-513 of contiguous time that indicates movement. Within the intervals, the leader determines features, such as, a total number of activations, a sequence of neighbor activations, and which neighbors were activated first or last. These features, which are described in greater detail below, are simple to determine, and are designed to make the detectors invariant to orientation and velocity.

Because movements do not have a complex temporal structure, the sensors take a form of naive Bayesian classifiers. Thus, the sensors are computationally efficient. This is important because motion events can possibly be generated several times a second.

Superclusters

The next level L2 of the hierarchy is the supercluster. Superclusters are clusters of clusters. The supercluster includes all the clusters in an immediate vicinity. For example, if sensors sense an area a couple of meters across and clusters sense an area of about six meters across, then superclusters sense an area of about ten to fifteen meters across, depending on how the immediate vicinity is defined. Each supercluster has a supercluster leader.

A supercluster leader receives movement detections from the constituent clusters and uses this information to recognize activities 600. At ten meters, a supercluster 102 can cover a span of hallway, a small room, an elevator lobby, or an intersection of passageways.

While superclusters are large enough to begin to incorporate elements of environment context, we assert that the superclusters still have sufficient locality to represent reusable components of behavior.

The level L2 activity models incorporate both spatial and temporal context to recognize activities in the field of sensing of the supercluster. The models take a form of dynamic belief networks.

Figure 6:
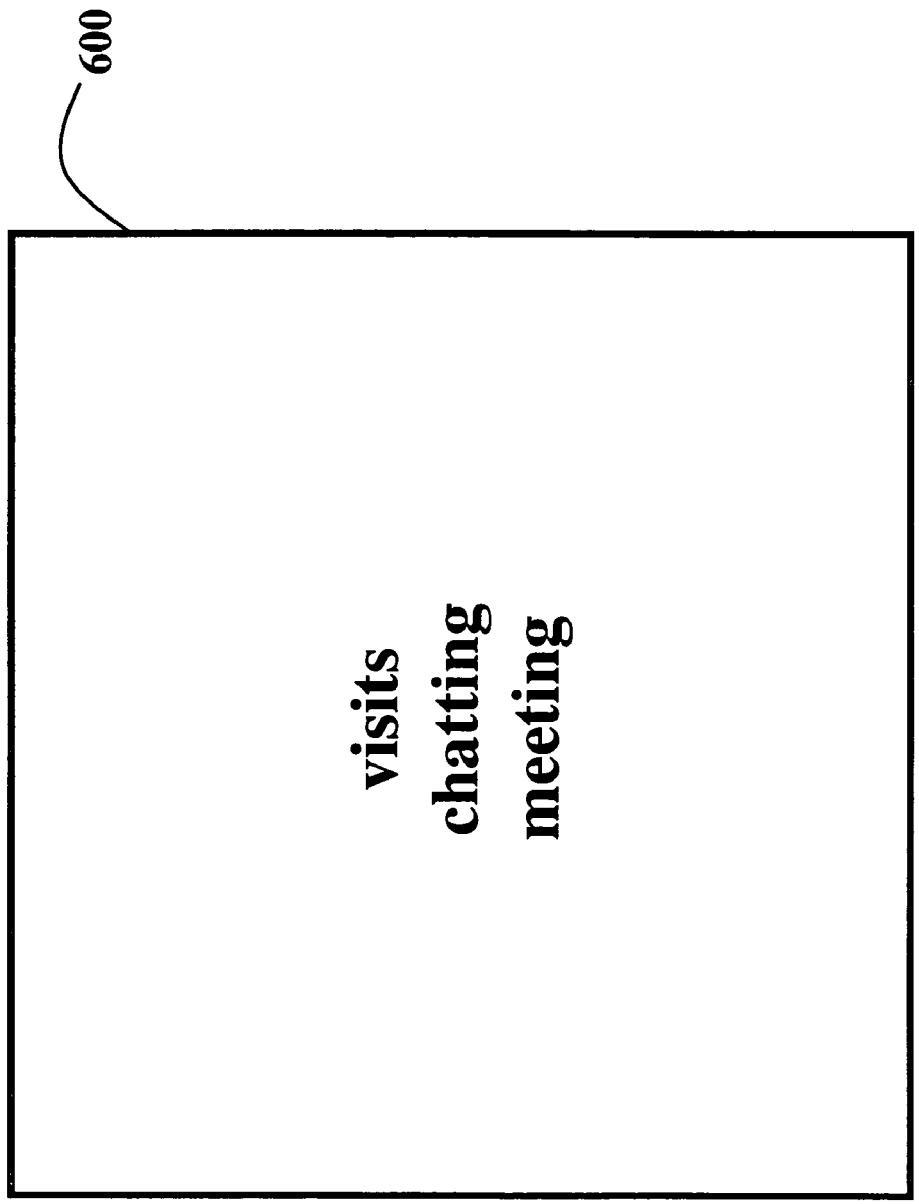
FIG. 6 is a block diagram of activities according to an embodiment of the invention.

FIG. 6 shows three activities 600, visits, chatting, and meeting. Visiting is an activity where a person approaches a locale, remains in that locale for a short time, and then leaves. Examples include visiting fixed resources such as a printer or a coffee pot, but also short visits to an office. Chatting is an activity that involves two people joining in a hallway, presumably to have a short conversation. Meeting is the activity where several people converge on a location over a period of minutes, presumably to participate in a scheduled meeting.

While we claim that these models are reusable across buildings, they are not as universal as the movement models. These models are appropriate for an office setting, and are portable to other collaborative environments.

There are probably a large number of activities that could be observed at the supercluster level. Some of these activities will have more or less meaning depending on the context. Each class of application domain, e.g., factory, retail, office, home, educational can have an associated a library of activities appropriate to that context.

The Multi-Actor Problem

A major issue when observing activities of multiple people is a data association problem. That is, in the relatively simple architecture with binary sensors as described herein, it is relatively difficult to associate sensed motion with particular individuals, particularly over extended periods of time.

Most prior art systems assume that individuals must be tracked accurately within the environment before any interpretation is attempted. In that case, all data are first associated with a track, and the track becomes the representation used by a recognition process. That also assumes that the sensors have sufficient fidelity and coverage to make tracking possible. That, in turn, generally implies either ubiquitous camera coverage, or the presence of tracking and identification tags attached to individual users. In situations where those assumption are valid, the prior art offers a number of solutions.

However, we assert that those assumptions are not valid for most arbitrary environments. Further, economic, ethical, and privacy concerns are likely to bar such systems from most, if not all environments.

Rather than trying to distinguish individuals at a first stage of processing, we elect instead to first draw a distinction between independent individuals and co-acting individuals. Instead of tracking individuals, we assume that people within a certain distance of each other are not acting independently. Rather, the people are engaged in some recognizable joint movement. Specifically, the distance is the radius of a level L1 neighborhood. If two people meet in a particular neighborhood, then that is recognized as a single movement, i.e., joining.

At level L2, we begin to resolve the multi-actor problem. The radius of a level L2 neighborhood is about ten meters, so it is unreasonable to assert that the movements of people 5-10 meters apart are significantly correlated. The presence of such weakly correlated actors increases the variability of behavior, and therefore increases the number and complexity of movement models that we would need to consider.

The solution at level L2 recognizes all possible interpretations of the observed activity. This allows us to capture recognizable activities that might occur in the presence of distracting motions due to other actors. The ambiguity generated by these non-exclusive detections is passed up to the next level to be resolved using an external context.

Environment Configurations

We find that above level L2, we begin to naturally refer to the neighborhoods with architectural terms: a laboratory, a wing, a floor, a building, a campus. We also see that constraints of the floor plan of the environment start to significantly intrude on the formation of neighborhoods. For example, if the floor plan is allowed to grow large, then the neighborhoods start to loop back on themselves. At an extreme, if the floor of a building is observed by 100 sensors and we continue building neighborhoods in the same way, then it does not make sense to have additional level L4 and L5 with 100 overlapping interpretations of the activity on that floor.

It would seem, therefore, that level L3 is a natural place to adapt our approach; this is true for geometric reasons, for contextual reasons, and for scalability reasons. We believe that behaviors at the floor- or wing-level naturally include the notion of individuals and places, e.g., Person A left her office, visited the coffee machine, and returned. The context of the behaviors includes the individual, as well as specific building context. Therefore, the next level of processing can include some form of stochastic parsing or chaining.

This process has much in common with tracking, except that the process is not based not on a similarity of signal characteristics, but instead on the consistency of interpretations along the chain. It also seems clear that some amount of local adaptation and context labeling may be required at installation time, e.g., providing building specific information, such as the floor plan, and the location of key resources, such as elevators, copy machines, and the like. This form of processing is very different from what we described above, and is well covered in the prior art.

Cluster Processing

Movement detection is performed in three steps: segmentation, feature extraction, and detection. The continuous stream 510 of binary motion detections is segmented using timeouts, as shown in FIG. 5, so that intervals of continuous movement are classified as a single observation.

The features set can includes salient elements such as: if a particular sensor signaled, if one sensor signaled before another, which sensor signaled first or last, and the number of events sensed. As stated above, the central cluster leader is treated specially. The neighbor nodes are numbered in order, clockwise, starting from an arbitrary origin.

After the features are extracted for a segment, detection is accomplished with a bank of Bayesian classifiers. The classifiers take a vector of features and determine the likelihood that a particular movement model hypothesis is true.

The models are trained by assuming a Gaussian distribution and estimating parameters, $\mu_k$ and $\Sigma_k$, from hand-labeled data:

$$p(o \mid \mu_k, \Sigma_k) = \frac{1}{(2\pi)^{\frac{m}{2}} |\Sigma_k|^{\frac{1}{2}}} e^{-\frac{1}{2}(o-\mu_k)^T \Sigma_k^{-1}(o-\mu_k)}, \quad (1)$$

where o is a feature vector, m is the length of the feature vector, and T is a transform operator.

In the case of a naive Bayesian classifier, the features are assumed to be independent; specifically, $\Sigma_k$ is assumed to be diagonal. This independence assumption significantly reduces the computational load associated with evaluating $p(o|\mu_k, \Sigma_k)$. We achieve very good results from the movement classifiers despite this simplifying assumption.

Note that the feature vector o is not a temporal sequence. It is a single vector that summarizes the entire observation sequence. Some of the features, such as total observation count, implicitly encode temporal aspects of the data. However, in general, the features are designed to be invariant to the overall velocity of the movement.

Topology

Clusters

To construct clusters and superclusters, we use the topology of a hierarchical network. That is because we need to know both which nodes are near the cluster leader, and also the ordering of the neighbors around each leader. Note that this does not require manual calibration of the system. It has been shown that it is possible to recover the geometry of a sensor network from unconstrained motion, see, e.g., Wren et al., "Self-configuring, lightweight sensor networks for ubiquitous computing," The Fifth International Conference on Ubiquitous Computing: Adjunct Proceedings, October 2003; and U.S. patent application Ser. No. 10/684,116, "Traffic and Geometry Modeling with Sensor Networks," filed by Christopher Wren on Oct. 10, 2003, both incorporated herein by reference. We use a similar technique to automatically 'discover' the neighborhoods as described herein.

Superclusters

At level L2, we are recognizing activities. This processing uses a broader spatial context, as well as more detailed temporal models. The supercluster leader receives movement classifications from its neighboring level L1 clusters. These classifications are generated at a relatively slow rate, perhaps one event every several seconds. Because the input events are discrete labels and because the events are generated very infrequently, we can recognize these events with hidden Markov models (HMMs).

The HMMs are parametric models that contain a set of states and a model of how the process transitions through those states. Each state is associated with a distinct conditional probability distribution over the space of all possible observations. In our case, the observations are discrete values, such as Boolean values or counts, so the observation likelihood function is represented as a discrete set of probabilities: $b_i(f_i)=\Pr[f_i]$, where $f_i$ is the vector of features at index i.

The transitions are assumed to be first-order Markov, shaped by a transition probability matrix A.

$$P(f_i \mid F, \lambda) = \sum_{q=1}^{N} b_q(f_i) \left[ \sum_{p=1}^{N} P(F \mid Q = p, \lambda) a_{pq} \right], \quad (2)$$

where $\lambda$ is the learned parameters of the HMM, N is the number or states in the HMM, $a_{pq}$ is the element of the matrix A that specifies the probability of transitioning from state p to state q, Q is the current state, F is the collection of prior feature observations, and $b_q(f_i)$ is the probability of making the observation f while in state q.

This model incorporates information about the temporal structure of a process in the transition matrix. The model offers invariance to warping of the temporal signal. The observation process also tolerates noise in the signal. There is an efficient, well known method for evaluating these kinds of models called the Viterbi algorithm, see, e.g., Rabiner, "A tutorial on hidden Markov models and selected applications in speech recognition," Proceedings of IEEE, 77(2):257-285, 1989, incorporated herein by reference.

These models can be trained with labeled data, often using the equally well known iterative Baum-Welch algorithm. This is typically the preferred method. However, when the feature space is sufficiently abstract, as in our case, it is sometimes possible simply to use models to serve as stochastic sentences in a very limited form of stochastic language, see, e.g., Ivanov et al., "EM for perceptual coding and reinforcement learning tasks," 8th International Symposium on Intelligent Robotic Systems, Reading, UK, 2000, incorporated herein by reference.

Hubs

Above the supercluster at level L2, we perform action 213 detection. Bobick, see above, defines action as collections of activities understood in a situational context. It may be possible to define libraries of useful elements for constructing action recognizers. However we anticipate significant local customization to be necessary, because salient elements of the context will likely include location specific information such as the floor plan or the location of resources such as elevators and meeting rooms.

Action recognition may also involve the linkage of the motion detector network to other infrastructure systems that can provide context, such as the elevator call system, or the building print queues. Stochastic parsing provides a mechanism for unifying evidence of large-scale events, see Ivanov et al. above. In this way, the individual action is introduced at the highest level as the process that is causing a chain of events. At this level, all possible disambiguating evidence is available. This is in contrast to tracking at the signal level.

It is to be understood that various other adaptations and modifications may be made within the spirit and scope of the invention. Therefore, it is the object of the appended claims to cover all such variations and modifications as come within the true spirit and scope of the invention.

We claim:

1. A system for detecting activities in a physical environment, comprising:
 a hierarchical network of motion sensors, the hierarchical network further comprising:
  a first level of individual motion sensors to detect motion events in the environment due to a presence of objects;
  a second level of clusters of the individual motion sensors to detect movements of the objects based on the motion events;
  a third level of superclusters of clusters to detect activities of the objects based on the movements; and
  a fourth level of hubs of superclusters to detect actions of the objects based on the activities.

2. The system of claim 1, in which each cluster includes a central cluster leader sensor, and immediately spatially adjacent motion sensors, and in which each supercluster includes a supercluster leader sensor and immediately spatial adjacent clusters.

3. The system of claim 2, in which each motion sensor is a cluster leader of immediately spatially adjacent motion sensors.

4. The system of claim 1, in which the motion sensors are wireless passive infrared motion detectors.

5. The system of claim 1, in which each motion event is associated with an identification of the motion sensor and a time the motion event occurred.

6. The system of claim 1, in which the motion events are binary values broadcast as a wireless signal.

7. The system of claim 1, in which the motion sensors substantially tile the environment.

8. The system of claim 1, in which the movements of the objects include passing through linearly, standing still, turning, entering, leaving, joining, and splitting.

9. The system of claim 1, in which cluster models representing the movements of the objects are banks of Bayesian classifiers trained using a cross-validation framework.

10. The system of claim 1, in which the motion events of each motion sensor form a stream of events, and the stream of events is segmented into segments with known time intervals, and the streams of all motion sensors in a cluster are received by the cluster leader.

11. The system of claim 1, in which the supercluster models representing the activities of the object are in the form of dynamic belief networks in the form of hidden Markov models trained using an iterative Baum-Welch algorithm.

12. The system of claim 1, in which the activities include visits, chatting, and meetings.

13. The system of claim 1, in which the movements are detected by extracting features from the segments, the features including identifiers of the sensors, a temporal ordering of the motion events, and a number of motion events in the segment.

14. The system of claim 1, in which sensed areas covered by the individual motion sensors are substantially disjoint and adjacent to tile the environment.

15. The system of claim 1, in which a particular motion sensor senses a substantially local circular area of about two meters radius.

16. The system of claim 1, in which a ratio of the number of clusters to the number of the individual motion sensors is less than one.

17. The system of claim 1, in which the individual motion sensors are moved to different environments and put into operation without recalibration and retraining.

18. The system of claim 1, in which the objects are people.

19. A method for detecting activities in an environment, comprising the steps of:
 detecting motion events with individual motion sensors;
 transmitting motion events to a cluster leader, each motion detector being a cluster leader of immediately spatially adjacent motion sensors;
 detecting movements of objects by the cluster leaders according to the motion events;
 transmitting the movements to supercluster leaders, each motion detector being a supercluster leader of immediately spatially adjacent motion clusters of sensors;
 detecting activities of the objects by the supercluster leaders according to the movements; and
 detecting actions of the objects according to the activities.

* * * * *